United States Patent
Mitsumori et al.

(10) Patent No.: US 8,356,494 B2
(45) Date of Patent: Jan. 22, 2013

(54) PROCESS FOR PRODUCING POROUS QUARTZ GLASS OBJECT, AND OPTICAL MEMBER FOR EUV LITHOGRAPHY

(75) Inventors: Takahiro Mitsumori, Tokyo (JP); Yasutomi Iwahashi, Tokyo (JP); Akio Koike, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 10 days.

(21) Appl. No.: 13/210,673

(22) Filed: Aug. 16, 2011

(65) Prior Publication Data

US 2011/0301015 A1    Dec. 8, 2011

Related U.S. Application Data

(63) Continuation of application No. PCT/JP2010/052875, filed on Feb. 24, 2010.

(30) Foreign Application Priority Data

Feb. 24, 2009    (JP) ................................. 2009-040455

(51) Int. Cl.
 *C03B 37/018* (2006.01)
 *C03C 3/06* (2006.01)
(52) U.S. Cl. ................. 65/413; 65/414; 65/421; 501/54
(58) Field of Classification Search ............ 501/54; 65/413–416, 421
See application file for complete search history.

(56) References Cited

U.S. PATENT DOCUMENTS

| | | | | |
|---|---|---|---|---|
| 6,735,981 B2 * | 5/2004 | Collins et al. | ................. | 65/17.4 |
| 7,294,595 B2 * | 11/2007 | Iwahashi et al. | ................. | 501/54 |
| 2002/0157421 A1 * | 10/2002 | Ackerman et al. | ............. | 65/17.6 |
| 2005/0005648 A1 * | 1/2005 | Lee et al. | ....................... | 65/382 |

FOREIGN PATENT DOCUMENTS

| | | |
|---|---|---|
| JP | 59-232932 | 12/1984 |
| JP | 60-260437 | 12/1985 |
| JP | 62-252342 | 11/1987 |
| JP | 2002-220253 | 8/2002 |
| JP | 2003-212560 | 7/2003 |
| JP | 2006-210404 | 8/2006 |
| WO | WO 2006/080241 | 8/2006 |

OTHER PUBLICATIONS

International Search Report issued Apr. 6, 2010 in PCT/JP2010/052875 filed Feb. 24, 2010.

* cited by examiner

*Primary Examiner* — Noah Wiese
(74) *Attorney, Agent, or Firm* — Oblon, Spivak, McClelland, Maier & Neustadt, L.L.P.

(57) ABSTRACT

A process for producing a porous quartz glass body containing hydrolyzing a metal dopant precursor and an $SiO_2$ precursor in a flame of a burner to form glass fine particles, and depositing and growing the formed glass fine particles on a base material, in which the burner has at least two nozzles, and in which a mixed gas containing (A) a metal dopant precursor gas, (B) an $SiO_2$ precursor gas, (C) one gas of $H_2$ and $O_2$, and (D) one or more gases selected from the group consisting of a rare gas, $N_2$, $CO_2$, a hydrogen halide and $H_2O$, with a proportion of the gas (D) being from 5 to 70 mol %; and (E) the other gas of $H_2$ and $O_2$ of (C), are fed into different nozzles of the burner from each other.

20 Claims, 1 Drawing Sheet

PROCESS FOR PRODUCING POROUS QUARTZ GLASS OBJECT, AND OPTICAL MEMBER FOR EUV LITHOGRAPHY

TECHNICAL FIELD

The present invention relates to a method for producing a porous quartz glass body, and more specifically, to a method for producing a porous quartz glass body containing a metal dopant such as $TiO_2$. The porous quartz glass body produced by the method according to the present invention is used for various purposes. For example, a porous quartz glass body containing $TiO_2$ as a metal dopant (a porous $TiO_2$—$SiO_2$ glass body) is suitable for an optical base material for EUV Lithography (EUVL) such as a mask blank or a mirror.

In the present specification, a quartz glass containing $TiO_2$ as a metal dopant is referred to as a $TiO_2$—$SiO_2$ glass.

Further, in the present specification, EUV (Extreme Ultra Violet) light means a light having a wavelength of a soft X-ray region or vacuum ultraviolet light region, and more specifically, a light having a wavelength of about from 0.2 to 100 nm.

BACKGROUND ART

In the light lithography technology, an exposure tool for producing an integrated circuit by transferring a fine circuit pattern onto a wafer has hitherto been widely utilized. With a trend toward a higher degree of integration and a higher performance of an integrated circuit, refinement of the integrated circuit is advanced, the exposure tool is required to form a circuit pattern with high resolution onto the surface of a wafer at long focal depth, and shortening of the wavelength of an exposure light source is advanced. The exposure light source is further advancing from conventional g-line (wavelength: 436 nm), i-line (wavelength: 365 nm), and KrF excimer laser (wavelength: 248 nm), and ArF excimer laser (wavelength: 193 nm) is to be employed. Further, to respond to the next generation integrated circuit in which a line width of a circuit pattern is 70 nm or less, an immersion exposure technique and double exposure technique using the ArF excimer laser are considered to be effective. However, those techniques are estimated to merely cover up to the generation in which the line width is 45 nm.

Under the foregoing technical trends, a lithography technique typically using, as an exposure light source, a light having a wavelength of 13 nm among EUV lights (extreme ultraviolet light) is considered to be applicable over generations in which a line width of a circuit pattern is 32 nm, and is attracting attention. The image formation principle in the EUV lithography (hereinafter abbreviated as "EUVL") is identical with that of the conventional lithography from the viewpoint that a mask pattern is transferred using a projection optical system. However, since there is no material capable of transmitting a light therethrough in the EUV light energy region, a refractive optical system cannot be used. Accordingly, the optical systems are all reflecting optical systems.

An optical system member of an exposure device for EUVL (an optical member for EUVL) is such as a photomask and a mirror, and is basically configured with (1) a base material, (2) a reflective multilayer formed on the base material, and (3) an absorber layer formed on the reflective multilayer. For the reflective multilayer, it is investigated to form an Mo/Si reflective multilayer in which an Mo layer and an Si layer are alternately laminated, and for the absorber layer, Ta and Cr are investigated as a forming material. As a base material used for producing an optical member for EUVL (an optical base material for EUVL), a material having a low coefficient of thermal expansion is required so as not to generate a strain even under irradiation with EUV light, and a glass and the like having a low coefficient of thermal expansion is investigated.

It is known that a coefficient of thermal expansion of a glass material is reduced by containing a metal dopant. Especially, a quartz glass containing $TiO_2$ as a metal dopant, that is, $TiO_2$—$SiO_2$ glass, is known as an extremely low expansion material having a coefficient of thermal expansion smaller than that of a quartz glass containing no metal dopant. Additionally, because the coefficient of thermal expansion can be controlled by $TiO_2$ content, a zero expansion glass having a coefficient of thermal expansion close to zero can be obtained. Therefore, the $TiO_2$—$SiO_2$ glass has the possibility as an optical base material for EUVL.

Patent Document 1 discloses: a process for producing a $TiO_2$—$SiO_2$ glass body containing a step of depositing and growing, on a base material, $TiO_2$—$SiO_2$ glass fine particles obtained by flame hydrolysis of glass-forming raw materials, to form a porous $TiO_2$—$SiO_2$ glass body (porous quartz glass body-forming step), a step of heating the porous $TiO_2$—$SiO_2$ glass body to a densification temperature to obtain a $TiO_2$—$SiO_2$ dense body (densification step), and a step of heating the $TiO_2$—$SiO_2$ dense body to a vitrification temperature in an atmosphere where an $H_2$ concentration is not more than 1,000 ppm, to obtain a $TiO_2$—$SiO_2$ glass body (vitrification step); a process for producing a $TiO_2$—$SiO_2$ glass body further containing, after the vitrification step, a step of heating the transparent $TiO_2$—$SiO_2$ glass body to a temperature of a softening point or higher to mold it in a desired shape (molding step); and a process for producing a $TiO_2$—$SiO_2$ glass body containing, after the vitrification step or the molding step, a step of carrying out an annealing treatment by holding the $TiO_2$—$SiO_2$ glass body at a temperature exceeding 500° C. for a predetermined period of time and then cooling to 500° C. at an average cooling rate of not more than 100° C./hr, or a step of carrying out an annealing treatment by cooling the molded glass body of 1,200° C. or higher to 500° C. at an average cooling rate of not more than 100° C./hr (annealing step). Incidentally, the foregoing porous quartz glass body-forming step is in general called a soot process.

In the foregoing porous quartz glass body-forming step by a soot process, for example, the porous quartz glass body is produced by leading out a $TiO_2$ precursor and $SiO_2$ precursor serve as the glass-forming raw materials, from a burner, hydrolyzing them in a flame to form glass fine particles, and depositing and growing the formed glass fine particles on a base material.

PRIOR ART DOCUMENT

Patent Document

Patent Document 1: JP-A-2006-210404 (WO2006/80241)

SUMMARY OF THE INVENTION

Problem to be Solved by the Invention

A porous $TiO_2$—$SiO_2$ glass body used for an optical base material for EUVL is required to have a small concentration distribution of $TiO_2$ in the glass body. In the existing circumstances, the concentration distribution of $TiO_2$ in the glass body is required to be not more than 0.12 wt %. When the concentration distribution of $TiO_2$ in the glass body exceeds 0.12 wt %, a distribution of a coefficient of linear thermal expansion (ΔCTE) of an optical base material for EUVL which is produced using the glass body is larger than 6 ppb/° C. In the existing circumstances, in view of the fact that an optical base material for EUVL is required to have ΔCTE of not more than 6 ppb/° C., what the concentration distribution of $TiO_2$ in the glass body exceeds 0.12 wt % is of a problem.

It is expected that the requirements regarding the concentration distribution of $TiO_2$ in the glass body and ΔCTE will become severer.

In the case of using a porous $TiO_2$—$SiO_2$ glass body for an optical member for EUVL, the inventors of the present application have found that it is necessary to strictly control a temperature of the flame in the foregoing porous quartz glass-forming step.

That is, it is preferable that the flame temperature is higher because the flame hydrolysis is accelerated. However, when the flame temperature is too high, $TiO_2$ is crystallized when deposited, so that it causes a haze or stria and hence, brings a problem in the case of using the resulting porous $TiO_2$—$SiO_2$ glass body for an optical member for EUVL.

Also, in the case of paying attention to a subject generated by the hydrolysis, a hydrolysis rate is in a relation of $TiO_2$ precursor>$SiO_2$ precursor, and when the temperature is higher, a difference in reaction rate between the both becomes to disappear. Therefore, in the case where the flame temperature is too high, in the central part of the porous $TiO_2$—$SiO_2$ glass body (preform) to which the flame most likely applies, a reaction for generating $SiO_2$ sufficiently takes place, and a concentration of $TiO_2$ becomes relatively low. Meanwhile, in the peripheral part of the preform, the temperature is low, therefore a reaction for generating $TiO_2$ is accelerated; and a gas containing glass-forming raw materials reaches the peripheral part of the preform in a state where $SiCl_4$ in the glass-forming raw materials is positively consumed in the central part of the preform. Therefore, the concentration of $TiO_2$ in the peripheral part of the preform becomes relatively high. As a result, the concentration distribution of $TiO_2$ in the produced porous $TiO_2$—$SiO_2$ glass body becomes large.

Meanwhile, when the flame temperature is too low, $TiO_2$—$SiO_2$ glass fine particles obtained by flame hydrolysis cannot be efficiently deposited and grown on a base material, and a porous $TiO_2$—$SiO_2$ glass body cannot be obtained.

Also, even in the case where it is possible to efficiently deposit and grow $TiO_2$—$SiO_2$ glass fine particles obtained by flame hydrolysis, on a base material, the concentration distribution of $TiO_2$ in the produced porous $TiO_2$—$SiO_2$ glass body becomes large in the opposite manner to that in the case where the flame temperature is too high. That is, in the central part of the preform, the reaction for generating $SiO_2$ does not sufficiently take place, and the concentration of $TiO_2$ becomes higher than that in the peripheral part of the preform. Also, in the peripheral part of the preform, a gas containing glass-forming raw materials reaches in a state where $TiCl_4$ in the glass-forming raw materials is positively consumed in the central part of the preform, and therefore, the concentration of $TiO_2$ becomes lower than that in the central part of the preform.

In order to solve the foregoing problems of the conventional technologies, the present invention is to provide a production method for a porous quartz glass body containing a metal dopant, and in particular, to provide a production method of a porous quartz glass body, in which a flame temperature can be easily controlled and by which a porous $TiO_2$—$SiO_2$ glass body having a small concentration distribution of $TiO_2$ and suitable for an optical member for EUVL can be obtained.

Means for Solving the Problems

In order to accomplish the foregoing objects, the present invention provides a process for producing a porous quartz glass body comprising hydrolyzing a metal dopant precursor and an $SiO_2$ precursor in a flame of a burner to form glass fine particles, and depositing and growing the formed glass fine particles on a base material, wherein the burner has at least two nozzles, and wherein
a mixed gas containing
(A) a metal dopant precursor gas,
(B) an $SiO_2$ precursor gas,
(C) one gas of $H_2$ and $O_2$, and
(D) one or more gases selected from the group consisting of a rare gas, $N_2$, $CO_2$, a hydrogen halide and $H_2O$, with a proportion of the gas (D) being from 5 to 70 mol %; and
(E) the other gas of $H_2$ and $O_2$ of (C), are fed into different nozzles of the burner from each other.

In the process for producing a porous quartz glass body according to the present invention, it is preferred that the metal dopant is $TiO_2$.

In the present specification, though detailed explanations will be made for a production process of a porous quartz glass body containing $TiO_2$ as the metal dopant (a porous $TiO_2$—$SiO_2$ glass body), the present invention is not construed as being limited thereto.

In the process for producing a porous quartz glass body according to the present invention, it is preferred that the gases (A) to (D) are mixed by a mixer.

In the process for producing a porous quartz glass body according to the present invention, it is preferred that the gases (A) to (D) are mixed at 75° C. or higher.

In the process for producing a porous quartz glass body according to the present invention, it is preferred that the burner is a multitubular burner.

In the process for producing a porous quartz glass body according to the present invention, it is preferred that the mixed gas is fed into a central nozzle of the multitubular burner, and the gas (E) is fed into a peripheral nozzle of the multitubular burner, disposed concentric to the central nozzle.

In the process for producing a porous quartz glass body according to the present invention, it is preferred that a second peripheral nozzle disposed concentric to the central nozzle is provided between the central nozzle and the peripheral nozzle of the multitubular burner, and (F) one or more gases selected from the group consisting of a rare gas, $N_2$, $CO_2$, a hydrogen halide and $H_2O$ are fed into the second peripheral nozzle.

In the process for producing a porous quartz glass body according to the present invention, it is preferred that one or more peripheral nozzles disposed concentric to the central nozzle are provided outside the peripheral nozzle of the multitubular burner.

Furthermore, the present invention provides an optical member for EUV lithography, which is fabricated using the porous quartz glass body produced by the foregoing method.

Effects of the Invention

According to the production method of the present invention, in producing a porous quartz glass body by hydrolyzing a metal dopant precursor and an $SiO_2$ precursor in a flame of a burner to form glass fine particles and depositing and growing the formed glass fine particles on a base material, a flame temperature of the burner can be easily controlled. As a result, in particular in the case of using $TiO_2$ as the metal dopant, a porous $TiO_2$—$SiO_2$ glass body in which crystallization of $TiO_2$ is suppressed and a concentration distribution of $TiO_2$ is small can be obtained.

The porous quartz glass body obtained by the production method of the present invention is suitable for use for an optical member for EUVL, because, in particular in the case of using $TiO_2$ as the metal dopant, crystallization of $TiO_2$ is suppressed, and a concentration distribution of $TiO_2$ is low and is not more than 0.12 wt %.

MODE FOR CARRYING OUT THE INVENTION

The present invention is hereunder described by reference to the drawing.

Figure 1:
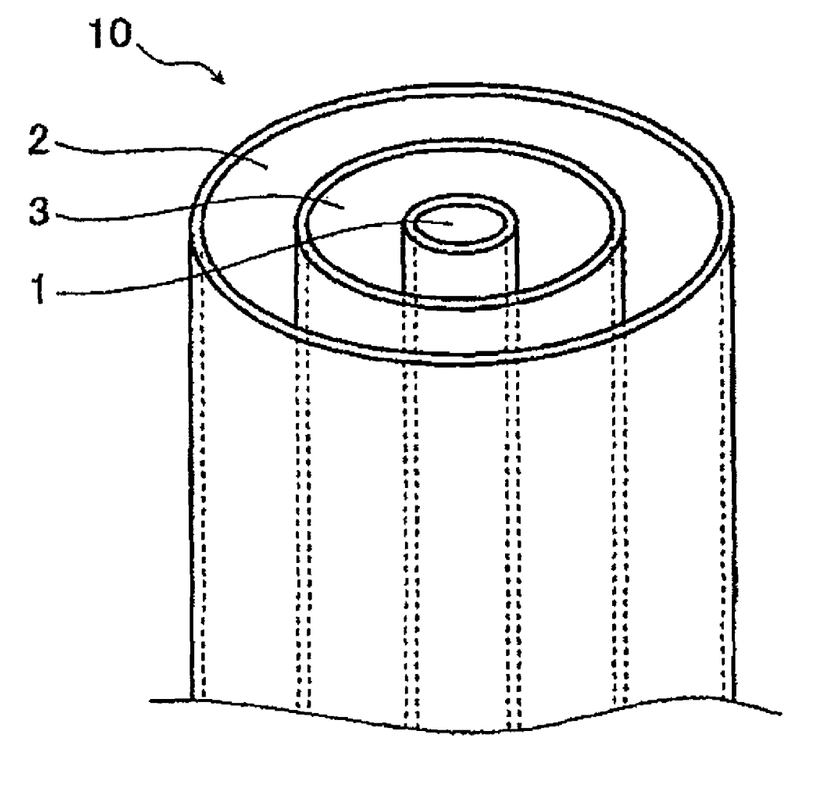
FIG. 1 is a perspective view showing an example of a burner to be used in the production method of the present invention.

FIG. 1 is a perspective view showing an example of a burner to be used in the production method of the present invention.

A burner 10 shown in FIG. 1 is a burner of a triple tubular structure in which a central nozzle 1 is present in the central part thereof, and a second peripheral nozzle 3 and a peripheral nozzle 2 are disposed concentric to the central nozzle 1.

In the case of carrying out the production method of the present invention using the burner 10 shown in FIG. 1, a mixed gas containing the following (A) to (D) gases is fed from the central nozzle 1.

(A) Metal dopant precursor gas
(B) $SiO_2$ precursor gas
(C) One gas of $H_2$ and $O_2$
(D) One or more gases selected from the group consisting of a rare gas, $N_2$, $CO_2$, a hydrogen halide and $H_2O$ The gases (A) to (D) are hereunder described.

(A) Metal Dopant Precursor Gas:

As the metal dopant in the present invention, $SnO_2$, $TiO_2$ and the like can be exemplified, with $TiO_2$ being preferable. The case of using $TiO_2$ as the metal dopant is hereunder described in detail. The $TiO_2$ precursor gas is a gas of a $TiO_2$ precursor which is, for example, titanium halide compounds such as $TiCl_4$, and $TiBr_4$; or alkoxytitaniums represented by $R_nTi(OR)_{4-n}$ (wherein R is an alkyl group having a carbon number of from 1 to 4, and n is an integer of from 0 to 3, provided that plural Rs may be the same as or different from each other).

(B) $SiO_2$ Precursor Gas:

The $SiO_2$ precursor gas is a gas of an $SiO_2$ precursor which is, for example, silicon halide compounds inclusive of chlorides such as $SiCl_4$, $SiHCl_3$, $SiH_2Cl_2$, and $SiH_3Cl$, fluorides such as $SiF_4$, $SiHF_3$, and $SiH_2F_2$, bromides such as $SiBr_4$ and $SiHBr_3$, and iodides such as $SiI_4$; or alkoxysilanes represented by $R_aSi(OR)_{4-n}$, (wherein R is an alkyl group having a carbon number of from 1 to 4, and n is an integer of from 0 to 3, provided that plural Rs may be the same as or different from each other).

(C) One Gas of $H_2$ and $O_2$:

Though both $H_2$ and $O_2$ are combustion gases for forming an oxyhydrogen flame by the burner 10, when the both are fed from the same nozzle (in this case, the central nozzle 1), there is a concern that back fire is generated from the central nozzle 1, or a combustion reaction takes place closest to the central nozzle 1, thereby damaging the central nozzle 1. For that reason, one gas of $H_2$ and $O_2$ (for example, $H_2$) is fed from the central nozzle 1, whereas the other gas (for example, $O_2$) is fed as a gas of a group of (E) from another nozzle of the burner (in the case of the burner 10 shown in FIG. 1, the peripheral nozzle 2).

(D) One or more Gases Selected from the Group Consisting of a Rare Gas, $N_2$, $CO_2$, a Hydrogen Halide and $H_2O$:

The foregoing gases (A) to (C) are in general fed as a mixed gas from the central nozzle of the burner when a porous $TiO_2$—$SiO_2$ glass body is produced by a soot process.

In the production method of the present invention, the flame temperature (oxyhydrogen flame temperature) of the burner is controlled by mixing (D) one or more gases selected from the group consisting of a rare gas, $N_2$, $CO_2$, a hydrogen halide and $H_2O$ in addition to the foregoing gases (A) to (C). A common point of the gases shown in the group (D) is that all of them are neither a combustible gas nor a combustion supporting gas. In the production method of the present invention, the flame temperature of the burner can be controlled by incorporating such a gas into the mixed gas to be fed from the central nozzle of the burner and changing a proportion of the gas of the group (D) in the mixed gas.

The control of the flame temperature of the burner in the present invention means that the flame temperature of the burner is controlled to a condition suitable for obtaining a porous quartz glass body in which a haze after a vitrification step is small and a concentration distribution of the metal dopant is small.

Especially preferably, for example, in the case of using $TiO_2$ as the metal dopant, it means that the flame temperature of the burner is controlled to a condition suitable for obtaining a porous $TiO_2$—$SiO_2$ glass body in which a deposition amount of $TiO_2$ large crystals is small and the concentration distribution of $TiO_2$ is not more than 0.12 wt %.

More specifically, it means that in the flame of the burner, the temperature of the flame in a region where a mixed gas containing the gases of the groups (A) and (B) serving as the glass-forming raw materials passes through, that is, the temperature of a region where the flame hydrolysis of the glass-forming raw materials is carried out, is controlled within a specified range.

In the present invention, in the case of being not specifically indicated, the flame temperature of the burner means a flame temperature in a region where the mixed gas containing the gases of the groups (A) and (B) serving as the glass-forming raw materials passes through. In the production method of the present invention, the temperature of the flame in this region is controlled to the range of from 900 to 1,600° C., more preferably the range of from 1,000 to 1,400° C., and still more preferably the range of from 1,100 to 1,300° C.

According to this, in the case of using $TiO_2$ as the metal dopant for example, by suppressing a deposition of $TiO_2$ crystals and particle growth, and by controlling the temperature of a region where the flame hydrolysis of the glass-forming raw materials is carried out, a porous $TiO_2$—$SiO_2$ glass body having a concentration distribution of $TiO_2$ of not more than 0.12 wt % can be obtained.

In the production method of the present invention, a proportion of the gas of the group (D) in the mixed gas is regulated to from 5 to 70 mol %. When the proportion of the gas of the group (D) falls outside the foregoing range, an effect for controlling the flame temperature of the burner cannot be sufficiently exhibited. Also, in the case of using $TiO_2$ as the metal dopant, a porous $TiO_2$—$SiO_2$ glass body in which a deposition amount of $TiO_2$ large crystals is small and the concentration distribution of $TiO_2$ is not more than 0.12 wt % cannot be obtained.

When the proportion of the gas of the group (D) is less than 5 mol %, the flame temperature of the burner becomes too high. According to this, in the case of using $TiO_2$ as the metal dopant for example, as described previously, in view of the fact that the concentration of $TiO_2$ in the central part of the preform becomes low as compared with that in the peripheral part of the preform, the concentration distribution of $TiO_2$ in the produced porous $TiO_2$—$SiO_2$ glass body becomes large, so that a porous $TiO_2$—$SiO_2$ glass body in which the concentration distribution of $TiO_2$ is not more than 0.12 wt % cannot be obtained. Also, $TiO_2$ is crystallized when deposited, so that there is a concern that it causes a haze or a stria in the case of using the resulting porous $TiO_2$—$SiO_2$ glass body for an optical member for EUVL.

Meanwhile, when the proportion of the gas of the group (D) exceeds 70 mol %, the flame temperature of the burner becomes too low. According to this, in the case of using $TiO_2$ as the metal dopant for example, as described previously, in view of the fact that the concentration of $TiO_2$ in the central part of the preform becomes high as compared with that in the peripheral part of the preform, the concentration distribution of $TiO_2$ in the produced porous $TiO_2$—$SiO_2$ glass body becomes large, so that a porous $TiO_2$—$SiO_2$ glass body in which the concentration distribution of $TiO_2$ is not more than 0.12 wt % cannot be obtained. Also, there is concerned that $TiO_2$—$SiO_2$ glass fine particles obtained by flame hydrolysis cannot be efficiently deposited and grown on a base material, and therefore a porous $TiO_2$—$SiO_2$ glass body cannot be obtained.

The proportion of the gas of the group (D) is more preferably from 10 to 50 mol %, and still more preferably from 15 to 35 mol %.

In the case of using a rare gas as the gas of the group (D), helium, neon or argon is preferable, and of these, argon is more preferable from the standpoint of costs.

In the case of using a hydrogen halide as the gas of the group (D), hydrogen fluoride, hydrogen chloride or hydrogen bromide is preferable.

Also, from the standpoint of costs or for the reason that specific heat of a polyatomic molecular gas is larger than that of a monoatomic molecular gas, so that the flame temperature is easily controllable, it is preferable to use $N_2$ or $CO_2$ as the gas of the group (D).

Meanwhile, proportions of the groups (A) to (C) in the mixed gas are as follows.

A proportion of the gas of the group (A) in the mixed gas is preferably from 0.2 to 1 mol %.

A proportion of the gas of the group (B) in the mixed gas is preferably from 4.7 to 26.2 mol %, more preferably from 9 to 16 mol %, and still more preferably from 12 to 14 mol %.

A proportion of the gas of the group (C) in the mixed gas is preferably from 10 to 90.1 mol %, more preferably from 30 to 80 mol %, and still more preferably from 45 to 70 mol %.

In the present invention, the gases of the groups (A) to (D) are fed from the central nozzle 1 of the burner 10 as the mixed gas previously mixed, and therefore, it is necessary to mix the gases of the groups (A) to (D) prior to feeding them into the central nozzle 1 of the burner 10. On that occasion, from the standpoint of controlling the flame temperature of the burner, it is important to always keep the proportions of the gases of the groups (A) to (D) in the mixed gas uniform. This is because when the proportions of the gases of the groups (A) to (D) vary in the mixed gas, the flame temperature of the burner fluctuates, and in the case of using $TiO_2$ as the metal dopant for example, there is a concern that a composition of the produced porous $TiO_2$—$SiO_2$ glass body, in particular, the concentration distribution of $TiO_2$, fluctuates.

In order to mix the gases of the groups (A) to (D) such that the proportions of these gases are uniform in the mixed gas, it is preferable to mix them using a mixer. Specific examples of a mixing method using a mixer include a method of mixing these gases in a premixing tank; a method of utilizing a static mixture; a method of dividing and mixing the gases utilizing a housing of a filter; and a method of mixing the gases by generating a jet stream using a narrow conduit.

Among the gases of the groups (A) to (D), the gas of each of the groups (A) and (B) is small in its proportion in the mixed gas, and therefore, in the case of being fed singly, there is a concern that a sufficient flow rate cannot be obtained because the gas amount to be fed is small. In order to obtain a sufficient flow rate, the gas of each of the groups (A) and (B) may be fed in a state of being mixed with a carrier gas.

As the carrier gas which is used for this purpose, $H_2$, $N_2$, argon or the like can be used.

In the foregoing carrier gas, a gas corresponding to the gas of the group (C) or (D) is included. In the case of using, as the foregoing carrier gas, a gas corresponding to the gas of the group (C) or (D), it is necessary to adjust the proportion of the gas of the group (C) or (D) in the mixed gas to the foregoing proportions while counting the gases used as such a carrier gases.

Among the gases of the groups (A) to (D), the gases of the groups (A) and (B) include a gas having a relatively high boiling point. In the case of using a gas having a relatively high boiling point as the gas of the group (A) or (B), it is necessary to mix the gases of the groups (A) to (D) under a condition that the gases are not liquefied. At mixing the gases of the groups (A) to (D), when a gas having a high boiling point is liquefied, there is a concern that problems that the composition of the mixed gas does not become an intended composition (the liquefied gas is not sufficiently mixed, so that the proportion of this gas becomes small); or that the conduit for feeding the mixed gas into the burner is clogged due to liquefaction of the gas; or the like are caused.

For the purpose of preventing the liquefaction of the gases of the groups (A) and (B), it is necessary that a conduit temperature on the downstream side relative to a place where the gases of the groups (A) and (B) are fed is increased to control a vapor pressure of the gases of the groups (A) and (B) so as not to become lower than that in the place where the gases are fed; and that the gases of the groups (A) to (D) are mixed at a temperature higher than that. In view of the fact that the feeding of the gas of each of the groups (A) and (B) is in general carried out at a temperature of 75° C. or higher, the mixing of the gases of the groups (A) to (D) is carried out preferably at 75° C. or higher, more preferably carried out at 150° C. or higher, and especially preferably carried out at 180° C. or higher. Also, 250° C. or lower is preferable.

As described previously, one of $H_2$ and $O_2$ that are combustion gases for forming an oxyhydrogen flame is fed as the gas of the group (C) from the central nozzle 1 of the burner 10, and the other is fed as the gas of the group (E) from the peripheral nozzle 2 of the burner 10. Here, for the reason of safety, among the $H_2$ and $O_2$ fed from the burner 10, $H_2$ is needed to be completely consumed in the oxyhydrogen flame. In consequence, a proportion of a total amount of $H_2$ and a total amount of $O_2$ ($O_2/H_2$) is preferably 0.50 or more. Taking into consideration stability of synthesis, it is preferable to be fed in such a manner that the $O_2/H_2$ is from 0.55 to 1.0, still more preferably from 0.55 to 0.85, and especially preferably from 0.55 to 0.78.

As described previously, the reason why one of $H_2$ and $O_2$ is fed as the gas of the group (C) from the central nozzle 1 of the burner 10, and the other is fed as the gas of the group (E) from the peripheral nozzle 2 of the burner 10 is because, when the both are fed in a mixed state from the same nozzle (in this case, the central nozzle 1), there is a concern that back fire is generated from the central nozzle 1, or a combustion reaction takes place closest to the central nozzle 1, thereby damaging the nozzle. From the standpoint of preventing such a problem, it is preferable to feed the gas described above as the group (D) (a gas of a group (F)) as a sealing gas from the second peripheral nozzle 3 existing between the central nozzle 1 and the peripheral nozzle 2. In this case, it may be considered that feeding of the gas of the group (F) does not influence the control of the flame temperature in the present invention. In the case of changing the amount of the gas of the group (F), though it may be considered that the temperature in the region of the flame of the burner where the gas of the group (F) passes through changes, flame hydrolysis of the glass-forming raw materials is not carried out in this region. That is, this is because that it is considered that the influence against the region where the flame hydrolysis of the glass-forming raw materials is carried out is negligible.

Incidentally, in the present invention, a gas other than the foregoing gases may be added in an extent that the effects of the present invention are not impaired.

For example, it is possible to add water, an alcohol or the like for the purpose of accelerating the hydrolysis, or to add a methane gas or the like for the purpose of adjusting the flame temperature.

The production method of the present invention has been described above by referring to the case of using a burner of a triple tubular structure as an example. That is, the constitution is as follows.

Central nozzle: Mixed gas (gases of the groups (A) to (D))
    Second peripheral nozzle: Gas of the group (F)
    Peripheral nozzle (first peripheral nozzle): Gas of the group (E)

In the production method of the present invention, burners of a multitubular structure of quadruple or more multiple tubes can also be used. In this case, the mixed gas is fed from the central nozzle of a burner of a multitubular structure, and the gas of the group (E) is fed from a nozzle that is a peripheral nozzle relative to the central nozzle. Furthermore, from the above mentioned standpoint of preventing back fire or the like from the central nozzle, it is preferable not to feed the mixed gas and the gas of the group (E) from nozzles adjacent to each other, but to provide a nozzle for feeding the gas of the group (F) between the central nozzle for feeding the mixed gas and the peripheral nozzle for feeding the gas of the group (E). So far as this relation is met, the gas of the group (E) and the gas of the group (F) may be fed from plural nozzles, respectively.

Also, with respect to the multitubular burner, by dividing the central nozzle 1 of the burner 10 into a central burner 1' and a concentric central burner 1", the mixed gas may be fed into both the central nozzle 1' and the central nozzle 1". Similarly, by dividing the second peripheral nozzle 3 into concentric peripheral nozzle 3' and peripheral nozzle 3", the gas of the group (F) may be fed into the peripheral nozzle 3' and the peripheral nozzle 3". Furthermore, by dividing the peripheral nozzle 2 into concentric peripheral nozzle 2' and peripheral nozzle 2", the gas of the group (E) may be fed into both the peripheral nozzle 2' and the peripheral nozzle 2".

To take one example, in the case of a burner of a quintuple tubular structure, it is possible to take the following feeding mode.

Incidentally, a peripheral nozzle (1) is a nozzle adjacent to the central nozzle; peripheral nozzles (2), (3) and (4) are disposed adjacent to each other in this order; and the peripheral nozzle (4) is the nozzle positioned outermost.

Central nozzle: Mixed gas (gases of the groups (A) to (D))
    Peripheral nozzle (1): Gas of the group (F)
    Peripheral nozzle (2): Gas of the group (F)
    Peripheral nozzle (3): Gas of the group (E)
    Peripheral nozzle (4): Gas of the group (E)

Also, in FIG. 1, at least one or more peripheral nozzles are provided between the central nozzle 1 and the second peripheral nozzle 3 of the burner 10, whereby the gas of the group (C) can be fed. The porous quartz glass body is formed upon a reaction of the gas of the group (A) with the gas of the group (B) due to heat generated upon combustion of the gas of the group (C) with the gas of the group (E). Prior to the reaction of the gas of the group (A) and the gas of the group (B), the gas of the group (C) coming out from the peripheral nozzle provided outside the central nozzle previously combusts together with the gas of the group (E) coming out from the first peripheral nozzle, thereby generating heat. Therefore, the reaction of the gas of the group (A) with the gas of the group (B) can be accelerated.

Furthermore, at least one or more peripheral nozzles may be provided outside the first peripheral nozzle 2. More specifically, a peripheral nozzle for singly feeding each of the gas of the group (C) and the gas of the group (E) may be provided outside the peripheral nozzle 2. However, from the standpoint of preventing back fire, the gas of the group (C) and the gas of the group (E) are not fed from nozzles adjacent to each other, but it is always necessary to provide a peripheral nozzle for feeding the gas (F) between the peripheral nozzle for feeding the gas of the group (C) and the peripheral nozzle for feeding the gas of the group (E). According to these, the deposition surface temperature of the porous quartz glass body is controlled, and a stable porous glass quartz body is easily formed.

With respect to the feeding of gases from the multitubular burner, while it has been mentioned that plural embodiments can be chosen, in all of the cases, it is preferable to feed the mixed gas from the central nozzle.

In the production method of the present invention, a porous quartz glass body is produced by depositing and growing, on a base material, glass fine particles generated by hydrolyzing a metal dopant precursor such as $TiO_2$ and an $SiO_2$ precursor in a flame of a burner. From the standpoint of uniformly depositing the glass fine particles on the base material, it is preferable to feed the mixed gas containing the gases of the groups (A) and (B) from the central nozzle.

As describe previously, in the production method of the present invention, by incorporating the gas of the group (D) that is inert to combustion into the mixed gas to be fed from the central nozzle of the burner, and by regulating the proportion of the gas of the group (D) in the mixed gas to from 5 to 70 mol %, the flame temperature of the burner can be controlled. Specifically, in the case of using $TiO_2$ as the metal dopant for example, the flame temperature in a region where the mixed gas passes through is controlled to a temperature suitable for obtaining a porous $TiO_2$—$SiO_2$ glass body in which a concentration distribution of $TiO_2$ is not more than 0.12 wt %, specifically the range of from 900 to 1,600° C.

In the production method of the present invention, by adjusting the proportion of the gas of the group (B) relative to the amount of the gas of the group (A), for example, in the case of using $TiO_2$ as the metal dopant, the $TiO_2$ concentration in the produced porous $TiO_2$—$SiO_2$ glass body can be adjusted.

In the present invention, it is preferable that the gas of the group (C) is $H_2$ and the group of the group (E) is $O_2$. The reactions of the metal dopant precursor and the $SiO_2$ precursor include a hydrolysis reaction and a thermal oxidation reaction. In the latter case, a size of particles formed by the reaction is liable to become small, and there is a tendency that a bulk density of the obtained porous quartz glass body becomes small, so that handling becomes difficult. Then, it is preferable that by using $H_2$ as the gas of the group (C) and $O_2$ as the gas of the group (E), an oxygen concentration in an atmosphere where the metal dopant precursor and the $SiO_2$ precursor are present is decreased, thereby regulating the reaction such that a hydrolysis reaction is the main reaction.

Incidentally, in the production method of the present invention, a quartz glass-made seed rod (for example, a seed rod described in JP-B-63-24937) can be used as the base material. Also, not limited to a rod-shaped, but a plate-shaped base material may be used.

An optical member for EUVL can be obtained from the porous quartz glass body produced by the production method of the present invention by carrying out the same procedures as those in the conventional technologies. Specifically, for example, an optical member for EUVL can be obtained by carrying out the following procedures using a porous $TiO_2$—$SiO_2$ glass body obtained by using $TiO_2$ as the metal dopant.

A porous $TiO_2$—$SiO_2$ glass body is heated to a densification temperature in vacuo or in an inert gas atmosphere to obtain a $TiO_2$—$SiO_2$ dense body (densification step). The obtained $TiO_2$—$SiO_2$ dense body is heated to a transparent vitrification temperature to obtain a transparent $TiO_2$—$SiO_2$ glass body (vitrification step). The obtained transparent $TiO_2$—$SiO_2$ glass body is heated to a temperature of a softening point or higher to mold it in a desired shape (molding step), and then subjected to annealing according to a desired temperature schedule (annealing step), whereby an optical member for EUVL can be obtained. Incidentally, the foregoing respective steps can be carried out continuously or simultaneously.

In the production method of the present invention, the porous $TiO_2$—$SiO_2$ glass body obtained by using $TiO_2$ as the metal dopant has a $TiO_2$ concentration distribution of not more than 0.12 wt %. The optical member for EUVL obtained from such a porous $TiO_2$—$SiO_2$ glass body has a distribution of a coefficient of linear thermal expansion ($\Delta CTE$) of not more than 6 ppb/° C. and satisfies physical properties required for an optical member for EUVL.

EXAMPLES

The present invention is hereunder described in more detail with reference to the following examples, but it should not be construed that the present invention is limited thereto.

In the following Examples and Comparative Examples, a temperature of an oxyhydrogen flame was measured while placing a temperature-measuring portion (top) of a type B thermocouple (0.5 mm) at a position corresponding to the deposition surface of glass fine particles.

Incidentally, all of glass compositions of the following Examples and Comparative Examples are composed of 6.7 wt % of $TiO_2$ and 93.3 wt % of $SiO_2$.

Also, each of porous $TiO_2$—$SiO_2$ glass bodies prepared in the Examples and Comparative Examples was heated to 1,400° C. in a metalized furnace under a vacuum condition, thereby forming a $TiO_2$—$SiO_2$ dense body (densification step). The obtained $TiO_2$—$SiO_2$ dense body was subjected to a heat treatment at 1,660° C. for 2 hours, thereby achieving transparent vitrification (vitrification step). The obtained $TiO_2$—$SiO_2$ transparent glass body was further subjected to a heat treatment at 1,690° C. for 60 hours, thereby molding it into a block shape (molding step). The molded $TiO_2$—$SiO_2$ glass body was cooled to 1,000° C.; subjected to annealing to 950° C. at a cooling rate of 10° C./hr and then to 900° C. at a cooling rate of 5° C./hr; maintained at 900° C. for 70 hours; and then naturally cooled to room temperature (annealing step).

From the plate-shaped body of 152 mm square having a thickness of 6.35 mm prepared by slicing the obtained $TiO_2$—$SiO_2$ glass body, in its diagonal direction, nine plate-shaped samples of 20 mm square whose diagonals are arranged with that diagonal, were further cut out, and each of the samples was subjected to a fluorescent X-ray analysis, thereby measuring a $TiO_2$ concentration. A difference between the maximum value and the minimum value in the $TiO_2$ concentration was defined as a $TiO_2$ concentration distribution.

Also, after the obtained $TiO_2$—$SiO_2$ glass body was polished in a thickness of 2 mm, light from a high-brightness light source was introduced thereto, and a haze was observed by visual inspection, thereby achieving evaluation on five grades (the case where the glass body was pure white, and the opposite side to the glass body was not seen therethrough is graded as 5; the case where the opposite side to the glass body was slightly seen therethrough but was considerably cloudy is graded as 4; the case where the opposite side to the glass body was seen therethrough but was cloudy is graded as 3; the case where the opposite side to the glass body was seen therethrough but was slightly cloudy is graded as 2; and the case where no haze was observed, and the opposite side to the glass body was seen therethrough is graded as 1).

Also, $\Delta CTE$ of the sample was determined according to the following equation using the measurement result of the $TiO_2$ concentration distribution ($\Delta TiO_2$):

$$\Delta CTE \text{ (ppb/° C.)} = 50 \ (10^{-9}/° \text{C.}) \times \Delta TiO_2 \text{ (wt \%)}.$$

Example 1

$TiCl_4$ as the gas of the group (A), $SiCl_4$ as the gas of the group (B) and $H_2$ as the gas of the group (C) were used. Also, $N_2$ was used as the gas of the group (D). A proportion of the gas of the group (D) in the mixed gas was 25 mol %. Each of proportions of the gases of the groups (A) to (C) was as follows.

Gas of the group (A): 0.5 mol %
Gas of the group (B): 13.1 mol %
Gas of the group (C): 61.4 mol %

The gases of the groups (A) to (D) were introduced into a premixing tank kept at 75° C. through different ports from each other, and these gases were diffused and mixed such that a gas concentration was uniform within the tank. Thereafter, the temperature of a conduit was gradually increased, and the mixed gas heated at 200° C. was allowed to pass through a static mixer manufactured by Apriori Corporation and a gas filter manufactured by Pall Corporation, and fed into a central nozzle of a multitubular burner. $O_2$ was fed as the gas of the group (E) into a peripheral nozzle of the multitubular burner, and $N_2$ was fed as the gas of the group (F) into a second peripheral nozzle. A porous $TiO_2$—$SiO_2$ glass body having a diameter of about 300 mm and a length of about 500 mm was produced by hydrolysis in an oxyhydrogen flame under this condition. At the production of the porous $TiO_2$—$SiO_2$ glass body, a flame temperature of the burner in a region where the mixed gas passes through was 1,200° C.

By using a sample prepared by subjecting the obtained porous $TiO_2$—$SiO_2$ glass body to the densification step to annealing step according to the foregoing procedures and slicing it into a plate-shaped body of 152 mm square having a thickness of 6.35 mm, a $TiO_2$ concentration distribution was measured. As a result, it was found to be 0.07 wt %. It was confirmed from this result that $\Delta CTE$ of this sample was not more than 6 ppb/° C. Also, its haze was found to be 1 in terms of the five-grade evaluation.

Example 2

$O_2$ as the gas of the group (C), and into a peripheral nozzle, $H_2$ as the gas of the group (E) are fed. The other gas conditions are the same as Example 1.

The gases of the groups (A) to (D) are introduced into a premixing tank kept at 75° C. through different ports from each other, and these gases are diffused and mixed such that a gas concentration is uniform within the tank. Thereafter, the temperature of a conduit is gradually increased, and the mixed gas heated at 200° C. is allowed to pass through a static mixer manufactured by Apriori Corporation and a gas filter manufactured by Pall Corporation, and fed into a central nozzle of a multitubular burner. Under this condition, a porous $TiO_2$—$SiO_2$ glass body having a diameter of about 300 mm and a length of about 500 mm is produced by hydrolysis in an oxyhydrogen flame. At the production of the porous $TiO_2$—$SiO_2$ glass body, a flame temperature of the burner in a region where the mixed gas passes through is 1,400° C.

By using a sample to be prepared by subjecting the obtained porous $TiO_2$—$SiO_2$ glass body to the densification step to annealing step according to the foregoing procedures and slicing it into a plate-shaped body of 152 mm square having a thickness of 6.35 mm, a $TiO_2$ concentration distribution is measured. As a result, it is found to be not more than 0.12 wt %. It is confirmed from this result that ΔCTE of this sample is not more than 6 ppb/° C. Also, its haze is found to be 1 in terms of the five-grade evaluation.

Example 3

$H_2$ as the gas of the group (C) and He as the gas of the group (D) are used. A proportion of the gas of the group (D) in the mixed gas is 42 mol %. The other gas species are the same as Example 1. Each of proportions of the gases of the groups (A) to (C) is as follows.

Gas of the group (A): 0.5 mol %
Gas of the group (B): 13.1 mol %
Gas of the group (C): 44.4 mol %

The gases of the groups (A) to (D) are introduced into a premixing tank kept at 75° C. through different ports from each other, and these gases are diffused and mixed such that a gas concentration is uniform within the tank. Thereafter, the temperature of a conduit is gradually increased, and the mixed gas heated at 200° C. is allowed to pass through a static mixer manufactured by Apriori Corporation and a gas filter manufactured by Pall Corporation, and fed into a central nozzle of a multitubular burner. Under this condition, a porous $TiO_2$—$SiO_2$ glass body having a diameter of about 300 mm and a length of about 500 mm is produced by hydrolysis in an oxyhydrogen flame. At the production of the porous $TiO_2$—$SiO_2$ glass body, a flame temperature of the burner in a region where the mixed gas passes through is 1,200° C.

By using a sample to be prepared by subjecting the obtained porous $TiO_2$—$SiO_2$ glass body to the densification step to annealing step according to the foregoing procedures and slicing it into a plate-shaped body of 152 mm square having a thickness of 6.35 mm, a $TiO_2$ concentration distribution is measured. As a result, it is found to be not more than 0.12 wt %. It is confirmed from this result that ΔCTE of this sample is not more than 6 ppb/° C. Also, its haze is found to be 1 in terms of the five-grade evaluation.

Example 4

$H_2$ as the gas of the group (C) and $CO_2$ as the gas of the group (D) are used. A proportion of the gas of the group (D) in the mixed gas is 17 mol %. The other gas species are the same as Example 1. Each of proportions of the gases of the groups (A) to (C) is as follows.

Gas of the group (A): 0.5 mol %
Gas of the group (B): 13.1 mol %
Gas of the group (C): 69.4 mol %

The gases of the groups (A) to (D) are introduced into a premixing tank kept at 75° C. through different ports from each other, and these gases are diffused and mixed such that a gas concentration is uniform within the tank. Thereafter, the temperature of a conduit is gradually increased, and the mixed gas heated at 200° C. is allowed to pass through a static mixer manufactured by Apriori Corporation and a gas filter manufactured by Pall Corporation, and fed into a central nozzle of a multitubular burner. Under this condition, a porous $TiO_2$—$SiO_2$ glass body having a diameter of about 300 mm and a length of about 500 mm is produced by hydrolysis in an oxyhydrogen flame. At the production of the porous $TiO_2$—$SiO_2$ glass body, a flame temperature of the burner in a region where the mixed gas passes through is 1,250° C.

By using a sample to be prepared by subjecting the obtained porous $TiO_2$—$SiO_2$ glass body to the densification step to annealing step according to the foregoing procedures and slicing it into a plate-shaped body of 152 mm square having a thickness of 6.35 mm, a $TiO_2$ concentration distribution is measured. As a result, it is found to be not more than 0.12 wt %. It is confirmed from this result that ΔCTE of this sample is not more than 6 ppb/° C. Also, its haze is found to be 2 in terms of the five-grade evaluation.

Example 5

$H_2$ as the gas of the group (C) and $N_2$ as the gas of the group (D) are used. A proportion of the gas of the group (D) in the mixed gas is 8 mol %. The other gas species are the same as Example 1. Each of proportions of the gases of the groups (A) to (C) is as follows.

Gas of the group (A): 0.5 mol %
Gas of the group (B): 13.1 mol %
Gas of the group (C): 78.4 mol %

The gases of the groups (A) to (D) are introduced into a premixing tank kept at 75° C. through different ports from each other, and these gases are diffused and mixed such that a gas concentration is uniform within the tank. Thereafter, the temperature of a conduit is gradually increased, and the mixed gas heated at 200° C. is allowed to pass through a static mixer manufactured by Apriori Corporation and a gas filter manufactured by Pall Corporation, and fed into a central nozzle of a multitubular burner. Under this condition, a porous $TiO_2$—$SiO_2$ glass body having a diameter of about 320 mm and a length of about 500 mm is produced by hydrolysis in an oxyhydrogen flame. At the production of the porous $TiO_2$—$SiO_2$ glass body, a flame temperature of the burner in a region where the mixed gas passes through is 1,600° C.

By using a sample to be prepared by subjecting the obtained porous $TiO_2$—$SiO_2$ glass body to the densification step to annealing step according to the foregoing procedures and slicing it into a plate-shaped body of 152 mm square having a thickness of 6.35 mm, a $TiO_2$ concentration distribution is measured. As a result, it is found to be not more than 0.12 wt %. It is confirmed from this result that ΔCTE of this sample is not more than 6 ppb/° C. Also, its haze is found to be 3 in terms of the five-grade evaluation.

Example 6

$H_2$ as the gas of the group (C) and $N_2$ as the gas of the group (D) are used. A proportion of the gas of the group (D) in the mixed gas is 59 mol %. The other gas species are the same as Example 1. Each of proportions of the gases of the groups (A) to (C) is as follows.

Gas of the group (A): 0.5 mol %
Gas of the group (B): 13.1 mol %
Gas of the group (C): 27.4 mol %

The gases of the groups (A) to (D) are introduced into a premixing tank kept at 75° C. through different ports from each other, and these gases are diffused and mixed such that a gas concentration is uniform within the tank. Thereafter, the temperature of a conduit is gradually increased, and the mixed gas heated at 200° C. is allowed to pass through a static mixer manufactured by Apriori Corporation and a gas filter manufactured by Pall Corporation, and fed into a central nozzle of a multitubular burner. Under this condition, a porous $TiO_2$—$SiO_2$ glass body having a diameter of about 270 mm and a length of about 500 mm is produced by hydrolysis in an oxyhydrogen flame. At the production of the porous $TiO_2$—$SiO_2$ glass body, a flame temperature of the burner in a region where the mixed gas passes through is 900° C.

By using a sample to be prepared by subjecting the obtained porous $TiO_2$—$SiO_2$ glass body to the densification step to annealing step according to the foregoing procedures and slicing it into a plate-shaped body of 152 mm square having a thickness of 6.35 mm, a $TiO_2$ concentration distribution is measured. As a result, it is found to be 0.12 wt %. It is confirmed from this result that ΔCTE of this sample is not more than 6 ppb/° C. Also, its haze is found to be 1 in terms of the five-grade evaluation.

Example 7

The gas conditions are the same as in Example 1. The gases of the groups (A) to (D) are converged into one conduit by using T-union and allowed to pass through a static mixer kept at 75° C. Under this condition, a porous $TiO_2$—$SiO_2$ glass body having a diameter of about 300 mm and a length of about 500 mm is produced by hydrolysis in an oxyhydrogen flame. At the production of the porous $TiO_2$—$SiO_2$ glass body, a flame temperature of the burner in a region where the mixed gas passes through is 1,200° C.

By using a sample to be prepared by subjecting the obtained porous $TiO_2$—$SiO_2$ glass body to the densification step to annealing step according to the foregoing procedures and slicing it into a plate-shaped body of 152 mm square having a thickness of 6.35 mm, a $TiO_2$ concentration distribution is measured. As a result, it is found to be 0.12 wt %. It is confirmed from this result that ΔCTE of this sample is not more than 6 ppb/° C. Also, its haze is found to be 2 in terms of the five-grade evaluation.

Example 8

He as the gas of the group (F) into a second peripheral nozzle of a multitubular burner is fed. The other conditions are the same as Example 1. Under this condition, a porous $TiO_2$—$SiO_2$ glass body having a diameter of about 300 mm and a length of about 500 mm is produced by hydrolysis in an oxyhydrogen flame. At the production of the porous $TiO_2$—$SiO_2$ glass body, a flame temperature of the burner in a region where the mixed gas passes through is 1,200° C.

By using a sample to be prepared by subjecting the obtained porous $TiO_2$—$SiO_2$ glass body to the densification step to annealing step according to the foregoing procedures and slicing it into a plate-shaped body of 152 mm square having a thickness of 6.35 mm, a $TiO_2$ concentration distribution is measured. As a result, it is found to be 0.07 wt %. It is confirmed from this result that ΔCTE of this sample is not more than 6 ppb/° C. Also, its haze is found to be 1 in terms of the five-grade evaluation.

Example 9

$TiCl_4$ as the gas of the group (A), $SiCl_4$ as the gas of the group (B) and $H_2$ as the gas of the group (C) were used. Also, $N_2$ was used as the gas of the group (D). A proportion of the gas of the group (D) in the mixed gas was 17 mol %. Each of proportions of the gases of the groups (A) to (C) was as follows.

Gas of the group (A): 0.5 mol %
Gas of the group (B): 13.1 mol %
Gas of the group (C): 69.0 mol %

The gases of the groups (A) to (D) were introduced into a premixing tank kept at 75° C. through different ports from each other, and these gases were diffused and mixed such that a gas concentration was uniform within the tank. Thereafter, the temperature of a conduit was gradually increased, and the mixed gas heated at 200° C. was allowed to pass through a static mixer manufactured by Apriori Corporation and a gas filter manufactured by Pall Corporation, and fed into a central nozzle of a multitubular burner. $O_2$ was fed as the gas of the group (E) into a peripheral nozzle of the multitubular burner, and $N_2$ was fed as the gas of the group (F) into a second peripheral nozzle. A porous $TiO_2$—$SiO_2$ glass body having a diameter of about 300 mm and a length of about 500 mm was produced by hydrolysis in an oxyhydrogen flame under this condition. At the production of the porous $TiO_2$—$SiO_2$ glass body, a flame temperature of the burner in a region where the mixed gas passes through was 1,300° C.

By using a sample prepared by subjecting the obtained porous $TiO_2$—$SiO_2$ glass body to the densification step to annealing step according to the foregoing procedures and slicing it into a plate-shaped body of 152 mm square having a thickness of 6.35 mm, a $TiO_2$ concentration distribution was measured. As a result, it was found to be 0.05 wt %. It was confirmed from this result that ΔCTE of this sample was not more than 6 ppb/° C. Also, its haze was found to be 2 in terms of the five-grade evaluation.

Comparative Example 1

$TiCl_4$ as the gas of the group (A), $SiCl_4$ as the gas of the group (B) and $H_2$ as the gas of the group (C) were used. The gas of the group (D) was not used. Each of proportions of the gases of the groups (A) to (C) was as follows.

Gas of the group (A): 0.5 mol %
Gas of the group (B): 13.1 mol %
Gas of the group (C): 86.4 mol %

The gases of the groups (A) to (C) were introduced into a premixing tank kept at 75° C. through different ports from each other, and these gases were diffused and mixed such that a gas concentration was uniform within the tank. Thereafter, the mixed gas was fed into a central nozzle of a multitubular burner. $O_2$ was fed as the gas of the group (E) into a peripheral nozzle of the multitubular burner, and $N_2$ was fed as the gas of the group (F) into a second peripheral nozzle. A porous $TiO_2$—$SiO_2$ glass body having a diameter of about 330 mm and a length of about 500 mm was produced by hydrolysis in an oxyhydrogen flame under this condition. At the production of the porous $TiO_2$—$SiO_2$ glass body, a flame temperature of the burner in a region where the mixed gas passes through was 1,650° C.

By using a sample prepared by subjecting the obtained porous $TiO_2$—$SiO_2$ glass body to the densification step to annealing step according to the foregoing procedures and slicing it into a plate-shaped body of 152 mm square having a thickness of 6.35 mm, a $TiO_2$ concentration distribution was measured. As a result, in the center of the deposition surface of the porous $TiO_2$—$SiO_2$ glass body where the temperature became high with an increase of the flame temperature of the burner, the reaction of $SiO_2$ was accelerated and whereby the $TiO_2$ concentration became low. Hence, the $TiO_2$ concentration distribution was found to be 0.25 wt %. It was confirmed from this result that $\Delta CTE$ of this sample was 12.5 ppb/° C. Also, its haze was found to be 4 in terms of the five-grade evaluation.

Comparative Example 2

A proportion of the gas of the group (D) in the mixed gas is set to 80 mol %. The other gas species are the same as Example 1. Each of proportions of the gases of the groups (A) to (C) is as follows.
  Gas of the group (A): 0.5 mol %
  Gas of the group (B): 13.1 mol %
  Gas of the group (C): 6.4 mol %

The gases of the groups (A) to (D) are respectively introduced into a premixing tank kept at 75° C., and these gases are diffused and mixed such that a gas concentration is uniform within the tank. Thereafter, the temperature of a conduit is gradually elevated, and the mixed gas heated at 200° C. is allowed to pass through a static mixer manufactured by Apriori Corporation and a gas filter manufactured by Pall Corporation, and fed into a central nozzle of a multitubular burner. Even when it is intended to produce a porous $TiO_2$—$SiO_2$ glass body by hydrolysis in an oxyhydrogen flame under this condition, since the flame temperature of the burner in a region where the mixed gas passes through is very low (flame temperature: 600° C.), glass fine particles do not efficiently deposit on a base material, so that a porous $TiO_2$—$SiO_2$ glass body is not obtained.

Comparative Example 3

$TiCl_4$ as the gas of the group (A), $SiCl_4$ as the gas of the group (B) and $H_2$ as the gas of the group (C) are used. A combustible gas, $CH_4$ (D') is used in place of the gas of the group (D).

A proportion of the gas of the group (D') in the mixed gas is set to 25 mol %. The other gas species are the same as Example 1. Each of proportions of the gases of the groups (A) to (C) is as follows.
  Gas of the group (A): 0.5 mol %
  Gas of the group (B): 13.1 mol %
  Gas of the group (C): 61.4 mol %

The gases of the groups (A) to (C) and the gas (D') are introduced into a premixing tank kept at 75° C. through different ports from each other, and these gases are diffused and mixed such that a gas concentration is uniform within the tank. Thereafter, the temperature of a conduit is gradually increased, and the mixed gas heated at 200° C. is allowed to pass through a static mixer manufactured by Apriori Corporation and a gas filter manufactured by Pall Corporation, and fed into a central nozzle of a multitubular burner. A porous $TiO_2$—$SiO_2$ glass body having a diameter of about 320 mm and a length of about 500 mm is produced by hydrolysis in an oxyhydrogen flame under this condition. At the production of the porous $TiO_2$—$SiO_2$ glass body, a flame temperature of the burner in a region where the mixed gas passes through is 1,700° C.

By using a sample prepared by subjecting the obtained porous $TiO_2$—$SiO_2$ glass body to the densification step to annealing step according to the foregoing procedures and slicing it into a plate-shaped body of 152 mm square having a thickness of 6.35 mm, a $TiO_2$ concentration distribution is measured. Since the combustible gas $CH_4$ is fed, the flame temperature of the burner increases, the center of the deposition surface of the porous $TiO_2$—$SiO_2$ glass body becomes high in temperature, and a temperature difference of the periphery becomes large. Hence, the $TiO_2$ concentration distribution is 0.21 wt %. It is confirmed from this result that $\Delta CTE$ of this sample is 10.5 ppb/° C. Also, its haze is 4 in terms of the five-grade evaluation.

Comparative Example 4

$TiCl_4$ as the gas of the group (A), $SiCl_4$ as the gas of the group (B) and $H_2$ as the gas of the group (C) are used. A combustion supporting gas, $Cl_2$ (D") is used in place of the gas of the group (D). A proportion of the gas of the group (D") in the mixed gas is set to 25 mol %. The other gas species are the same as Example 1. Each of proportions of the gases of the groups (A) to (C) is as follows.
  Gas of the group (A): 0.5 mol %
  Gas of the group (B): 13.1 mol %
  Gas of the group (C): 61.4 mol %

The gases of the groups (A) to (C) and the gas (D") are introduced into a premixing tank kept at 75° C. through different ports from each other, and these gases are diffused and mixed such that a gas concentration is uniform within the tank. Thereafter, the temperature of a conduit is gradually increased, and the mixed gas heated at 200° C. is allowed to pass through a static mixer manufactured by Apriori Corporation and a gas filter manufactured by Pall Corporation, and fed into a central nozzle of a multitubular burner. A porous $TiO_2$—$SiO_2$ glass body having a diameter of about 320 mm and a length of about 500 mm is produced by hydrolysis in an oxyhydrogen flame under this condition. At the production of the porous $TiO_2$—$SiO_2$ glass body, a flame temperature of the burner in a region where the mixed gas passes through is 1,650° C.

By using a sample prepared by subjecting the obtained porous $TiO_2$—$SiO_2$ glass body to the densification step to annealing step according to the foregoing procedures and slicing it into a plate-shaped body of 152 mm square having a thickness of 6.35 mm, a $TiO_2$ concentration distribution is measured. Since the combustion supporting gas $Cl_2$ is fed, the flame temperature of the burner increases, the center of the deposition surface of the porous $TiO_2$—$SiO_2$ glass body becomes high in temperature, and a temperature difference of the periphery becomes large. Hence, the $TiO_2$ concentration distribution is 0.38 wt %. It is confirmed from this result that $\Delta CTE$ of this sample is 19 ppb/° C. Also, its haze is 3 in terms of the five-grade evaluation.

While the present invention has been described in detail and with reference to specific embodiments thereof, it will be apparent to one skilled in the art that various changes and modifications can be made therein without departing from the spirit and scope thereof.

This application is based on Japanese patent application No. 2009-040455 filed on Feb. 24, 2009, and the entire contents of which are incorporated hereinto by reference.

DESCRIPTION OF REFERENCE NUMERALS AND SIGNS

1: Central nozzle
2: Peripheral nozzle
3: Second peripheral nozzle
10: Burner

The invention claimed is:

1. A process for producing a porous quartz glass body, comprising:
   hydrolyzing a metal dopant precursor and an $SiO_2$ precursor in a flame of a burner to form glass fine particles; and
   growing the glass fine particles on a base material,
   wherein the burner has at least two nozzles comprising a first nozzle and a second nozzle, and
   the hydrolyzing comprises feeding a first gas through the first nozzle and feeding a second gas through the second nozzle,
   the first gas comprises a mixed gas comprising (A) a metal dopant precursor gas, (B) an $SiO_2$ precursor gas, (C) one gas of $H_2$ and $O_2$, and (D) one or more gases selected from the group consisting of a rare gas, $N_2$, $CO_2$, a hydrogen halide and $H_2O$,
   the one or more gas gases (D) are included in the mixed gas in an amount of from 5 to 70 mol %, and
   the second gas comprises (E) one gas of $H_2$ and $O_2$ which is different from the gas (C).

2. The process according to claim 1, wherein a metal dopant is $TiO_2$.

3. The process according to claim 1, further comprising mixing the gases (A) to (D) by a mixer before the feeding of the first gas.

4. The process according to claim 1, wherein the gases (A) to (D) are mixed at 75° C. or higher.

5. The process according to claim 1, wherein the burner is a multitubular burner.

6. The process according to claim 5,
   wherein the first nozzle is a central nozzle of the multitubular burner, and
   the second nozzle is a peripheral nozzle of the multitubular burner, disposed concentric to the central nozzle.

7. The process according to claim 6,
   wherein the multitubular burner comprises a second peripheral nozzle disposed concentric to the central nozzle provided between the central nozzle and the peripheral nozzle, and
   (F) one or more gases selected from the group consisting of a rare gas, $N_2$, $CO_2$, a hydrogen halide and $H_2O$ are fed through the second peripheral nozzle.

8. The process according to claim 6, wherein in the multitubular burner, one or more third peripheral nozzles disposed concentric to the central nozzle are provided outside the peripheral nozzle.

9. The process according to claim 1, wherein the hydrolyzing comprises controlling a flame temperature of the burner to a range of from 900 to 1,600° C.

10. The process according to claim 1, wherein the hydrolyzing comprises controlling a flame temperature of the burner to a range of from 1,100 to 1,300° C.

11. The process according to claim 1, wherein the one or more gases (D) is included in the mixed gas in an amount of from 15 to 35 mol %.

12. The process according to claim 1, wherein the gases (A) to (D) are mixed at 180° C. or higher and 250° C. or lower.

13. A process for producing a transparent glass body, comprising:
   hydrolyzing a metal dopant precursor and an $SiO_2$ precursor in a flame of a burner to form glass fine particles;
   growing the glass fine particles on a base material to form a porous quartz glass body;
   heating the porous quartz glass body to a densification temperature to obtain a dense body; and
   heating the dense body to a transparent vitrification temperature,
   wherein the burner has at least two nozzles comprising a first nozzle and a second nozzle,
   the hydrolyzing comprises feeding a first gas through the first nozzle and feeding a second gas through the second nozzle,
   the first gas comprises a mixed gas comprising (A) a metal dopant precursor gas, (B) an $SiO_2$ precursor gas, (C) one gas of $H_2$ and $O_2$, and (D) one or more gases selected from the group consisting of a rare gas, $N_2$, $CO_2$, a hydrogen halide and $H_2O$,
   the one or more gases (D) is included in the mixed gas in an amount of from 5 to 70 mol %, and
   the second gas comprises (E) one gas of $H_2$ and $O_2$ which is different from the gas (C).

14. The process according to claim 13, wherein a metal dopant is $TiO_2$.

15. The process according to claim 13, wherein the gases (A) to (D) are mixed at 75° C. or higher.

16. The process according to claim 13, wherein the burner is a multitubular burner, the first nozzle is a central nozzle of the multitubular burner, the second nozzle is a peripheral nozzle of the multitubular burner, disposed concentric to the central nozzle, and in the multitubular burner, one or more third peripheral nozzles disposed concentric to the central nozzle are provided outside the peripheral nozzle.

17. The process according to claim 13, wherein the hydrolyzing comprises controlling a flame temperature of the burner to a range of from 900 to 1,600° C.

18. The process according to claim 13, wherein the hydrolyzing comprises controlling a flame temperature of the burner to a range of from 1,100 to 1,300° C.

19. The process according to claim 13, wherein the one or more gases (D) is included in the mixed gas in an amount of from 15 to 35 mol %.

20. The process according to claim 13, wherein the gases (A) to (D) are mixed at 180° C. or higher and 250° C. or lower.

* * * * *